United States Patent
Randall et al.

(10) Patent No.: US 7,634,069 B2
(45) Date of Patent: Dec. 15, 2009

(54) METHOD OF AND APPARATUS FOR COMMUNICATING USER RELATED INFORMATION USING A WIRELESS INFORMATION DEVICE

(75) Inventors: Stephen Randall, London (GB); Scott Jenson, Edina, MN (US)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 11/781,928

(22) Filed: Jul. 23, 2007

(65) Prior Publication Data

US 2008/0045184 A1 Feb. 21, 2008

Related U.S. Application Data

(63) Continuation of application No. 10/362,105, filed as application No. PCT/GB01/03784 on Aug. 22, 2001, now Pat. No. 7,248,677.

(30) Foreign Application Priority Data

Aug. 22, 2000 (GB) ................... 0020737.3
May 2, 2001 (GB) ................... 0110779.6

(51) Int. Cl.
*H04M 11/00* (2006.01)

(52) U.S. Cl. .................................................. 379/93.17
(58) Field of Classification Search ............. 379/93.23, 379/210, 2, 211.01, 93.17, 102.01, 102.02; 455/412.1, 412.2, 414.1, 415, 456.4
See application file for complete search history.

(56) References Cited

U.S. PATENT DOCUMENTS 5,757,899 A * 5/1998 Boulware et al. ...... 379/207.02
5,930,700 A * 7/1999 Pepper et al. .......... 379/211.02

* cited by examiner

*Primary Examiner*—Stella L Woo
(74) *Attorney, Agent, or Firm*—Saul Ewing LLP

(57) ABSTRACT

A mobile telephone which can supply or post 'pre-answer' information which the device owner considers of relevance to a potential call recipient. This information enables a potential call recipient to be given useful information about a potential call before actually answering that call. The information is dynamic, unlike Caller ID information. Examples include: information about the subject of an intended voice call, a mood, a current activity, part or whole of a schedule of meetings or events, information about the urgency of an intended voice call, personal information, expected call duration, commercial inducements to a consumer to answer a call (special offers, loyalty points etc.), location information.

24 Claims, No Drawings

METHOD OF AND APPARATUS FOR COMMUNICATING USER RELATED INFORMATION USING A WIRELESS INFORMATION DEVICE

CROSS-REFERENCE TO RELATED APPLICATIONS

This application is a continuation of U.S. application Ser. No. 10/362,105, filed Oct. 1, 2003, which claims the priority of PCT Application No. PCT/GB01/03784 filed Aug. 22, 2001 and British applications GB 0020737.3 filed Aug. 22, 2000 and GB 0110779.6 filed May 2, 2001.

BACKGROUND OF THE INVENTION

1. Field of the Invention

This invention relates to a method of an apparatus for communicating user related information using a wireless information device. The term 'wireless information device' used in this patent specification should be expansively construed to cover any kind of device with one or two way communications capabilities and includes without limitation radio telephones, smart phones, communicators, personal computers, computers and application specific devices. It includes devices able to communicate in any manner over any kind of network, such as GSM or UMTS mobile radio, Bluetooth, Internet etc.

2. Description of the Prior Art

Current generation wired and wireless telephones can indicate to a caller the status of a call recipient in only crude and potentially ambiguous terms: for example, when a caller makes a voice call, he or she might receive one of five different responses: (a) the desired call recipient answers; (b) there is no answer; (c) there is an engaged tone; (d) the call gets put through to a pre-recorded voice mail message or (e) the call gets diverted to someone else. If the intended call recipient does not actually answer the call, then the caller has no idea why the call was not answered: for example, is the intended recipient in fact there but too busy to answer? Could a different number have been dialed to connect successfully?

Conventional so-called 'Presence' systems are the subject of considerable interest at present and partly solve the above problems. The intent of Presence systems is to show the status of the prospective call recipient to a calling party—for example, giving information about whether the intended call recipient is busy, in a meeting, contactable on a mobile phone or land line etc. Reference may be made to RFC 2778 'A Model for Presence and Instant Messaging' February 2000, The Internet Society. Prior art Presence systems have not however been extended to cover the idea of the calling party indicating its own status, such as the subject of the intended call or its urgency.

Reference may also be made to conventional Instant Messaging (IM) systems, which allow a party able to participate in IM to indicate its status by selecting a pre-defined status flag (e.g. Out to Lunch; On-line etc.) Because these status flags show merely the status of a party, they are aimed at informing a party wishing to message that party whether doing so would be appropriate, and are therefore similar to the conventional telephony Presence systems described above.

Hence, both prior art IM and Presence systems share a presumption that the critical information to convey, prior to the main communication commencing, relates to the status of the entity which is the target of communications (e.g. whether they are reachable and if so how). This is an essentially asymmetric weighting of significance and ignores entirely the possibility that the person seeking to initiate communication (e.g. commence a voice call) can also provide the target (the call recipient) with useful information prior to the main communication commencing. Caller ID systems partly address this: they enable a called party to see the telephone number of the person calling. Caller ID systems are increasingly popular, since knowing the identity of the caller can be very pertinent to a decision to accept a call or not. Where the called party's device can store a database of numbers, the caller ID information can be matched against database entries, so that the called party's device can display the actual name of the person calling. At the most basic level, mobile telephone users use the caller ID to screen their calls so that, based on a number of factors relating to themselves (i.e. location, current activity etc.), they can look at the caller ID and make a number of assumptions about the identity of the caller and then take a decision regarding answering the call. However, users are increasingly feeling compelled to answer calls simply because they know that the mobile telephone is with them no matter where they are. Users are answering the mobile telephone even when it is not convenient for them. They are now trying to take various steps to control the reactive behaviours implicit with owning a mobile phone, despite the availability of Caller ID. For example:

- Some buy two mobile telephones; one is for personal use, the other for work.
- Some are insisting that the phone is turned off outside of work hours.
- Some simply decide, based on the Caller ID, that if no name is shown with the call—that the call is probably unimportant because they don't recognise the number. Conversely others interpret this same factor as indicating a potential emergency call.

Hence, the inherent limitations of Caller ID seriously restrict its practical utility.

Through the convergence of communications and computing, a new generation of intelligent communications devices, often referred to as smart phones or communicators, is being brought into being, utilising operating systems and related applications such as the Symbian OS platform from Symbian Limited of the United Kingdom. Wireless information devices based on the Symbian OS platform offer the promise of being 'smarter' than current generation GSM phones in being able to offer multiple advanced, robust client based applications. However, prior to the present invention, even these advanced wireless information devices would have been no more capable than existing phones in terms of providing rich information about a call to a call recipient prior to the call being answered.

SUMMARY OF THE PRESENT INVENTION

In a first aspect of the invention, there is a method of communicating user related information using a wireless information device in which a caller using a first wireless information device enters into the device information of potential relevance to a call recipient, the information being of a kind which varies;

the method comprising the step of transferring that information to a second wireless information device controlled by the call recipient, such that the call recipient is automatically provided with the information prior to accepting or answering a voice call from the caller.

The invention therefore envisages wireless information devices which can supply or post 'pre-answer' information which the device owner considers of relevance to a potential call recipient. This information enables a potential call recipient to be given useful information about a potential call before actually answering that call. Examples of the kinds of 'pre-answer' information which a calling party can input include without limitation the following: information about the subject of an intended voice call, a mood, a current activity, part or whole of a schedule of meetings or events, information about the urgency of an intended voice call, personal information, expected call duration, commercial inducements to a consumer to answer a call (special offers, loyalty points etc.), location information. The information must however be dynamic (i.e. potentially variable) and hence does not cover persistent information, such as conventional caller ID information.

From an operator revenue perspective, allowing a calling party to enrich their communication with pre-answer information is more potent than conventional Presence since a calling party can be expected to pay for this additional data service. Conventional Presence systems require input from the call recipient and, arguably, will need to be paid for by that call recipient and, as such, are likely to be difficult to establish commercially. Revenue models based on the principle of the 'calling party pays' have tended to be more successful than those in which the called party has to pay.

The invention may also embrace the conventional Presence situation in which a caller can be automatically provided with Presence information relating to the called party prior to initiating or starting a voice call with another person. Hence, the present invention may cover the symmetric situation of, prior to a voice call starting, a caller being give Presence information about the called party ('pre-call information') and the called party being give Presence information about the calling party ('pre-answer information').

The format of the information can be text, or other media formats, such as images (e.g. a digital picture of the calling party's current location taken with a digital camera on the calling party's device), icons (e.g. heart icons as pre-answer information to a boyfriend); or animated graphics (e.g. a Lara Croft cartoon figure; a personal avatar). A user could have several different sets of information which it selects manually or automatically depending on other data (e.g. the person called). Hence, a user could have one personal avatar figure for calling friend, and a different one for calling family. Icons and graphics can be selected from a menu of pre-stored options and may also be obtained from a remote server, in the same way as ring tones are currently downloaded. Just as custom ring tones have been highly effective in enabling mass customisation of mobile telephones and have generated significant and highly profitable revenue for network operators and ring tone suppliers, so can pre-answer icons and animated graphics. Pre-answer information may accompany or replace the call recipient's ring tone, in much the same way that caller ID does. It may relate specifically to a call (e.g. the subject of the call) or be more general (e.g. a mood). The information will typically precede an intended voice call, although the voice call itself may not occur for a variety of reasons.

As noted above, in conventional Presence systems, information is generated for or posted by a person who may be called; this can influence and inform a caller making an outgoing call to that person as it can be read and used by that caller to assess the situation of the person to be called. But the present invention goes beyond conventional Presence because the information of relevance can also be posted by a person doing the calling: it can influence and inform the person receiving an incoming call as it can be used by that call recipient to assess the subject of the call, its urgency, the mood of the caller and any other item input by the caller which more fully defines the context of the call. As will be described later, pre-call and pre-answer information can be generalised to a 'Virtual Presence', which can take the form of a customisable virtual avatar and can also represent facts about any user, i.e. both callers and targets, in any messaging context, and hence is not limited to use prior to a voice call. Hence, Virtual Presence could be used not only to enrich voice communication, but also data communication such as chat and instant messaging.

The present specification goes beyond conventional Presence by suggesting new categories of information which can be posted/input (such as moods and personal avatars) and new user interaction functions (such as the 'Convert to Text', 'Hold and Mute', 'Doodles' and 'EvolvIcons' described later). These innovations are independent of the insight of providing dynamic pre-answer information to a call recipient (e.g. defining the subject of an intended call). Hence, this specification discloses multiple innovations which are not limited in their application to circumstances where pre-answer is also used.

Scenarios

If we take a situation in which Alice knows Bob, Bob might post a 'mood message' saying "I need cheering up" on his device. Alice decides she wishes to call Bob; when she looks him up in the contacts manager application on her wireless information device, and selects a 'make voice call' function, Alice's device initiates communication with Bob's device. Prior to opening a voice channel, Bob's device returns as data (e.g. peer to peer SMS, Smart Message (a Nokia format) or data packet such as IPv6) his pre-call 'mood message', so that the message "I need cheering up" automatically appears on Alice's device. The device then prompts her whether she wishes to proceed with the voice call and/or post a responsive 'mood message'. She decides to do both; first she enters the message "I'll cheer you up Bob" and then initiates the voice call. Bob's device shows the "I'll cheer you up Bob" pre-answer message from Alice, so Bob immediately answers the call, already having a positive expectation about the likely social interaction with Alice.

Another situation might be that Bob posts a pre-call message saying "Anyone want to go to a cinema tonight?" on his wireless information device. He makes that information available to anyone listed in a 'Friends' category in his contacts database, held locally on his device. Alice decides coincidentally to call Bob; Bob's device recognises Alice as belonging to his 'Friends' class (e.g. through caller line ID, or a unique ID associated with Alice's device which Bob's device knows) and so automatically sends Alice's device the "Anyone want to go to a cinema tonight?" data prior to initiating the voice call. Alice in fact wants to have a long chat with someone tonight, and decides that Bob is not the right person to call right now.

Bob might also post a pre-call message saying "Now in a meeting with my boss till 5 pm". Then Alice, reading that information automatically provided to her when she selects Bob's name in her telephone application, can decide to not proceed with the voice call at that time. But perhaps if Alice knew Bob's boss, and wished to interrupt their meeting precisely so she could speak with both of them, she would call Bob immediately.

Knowing the situation of a call recipient in this way also allows the caller to override a call diversion function or call bar which has been set by the required call recipient. Suppose Bob is in an important meeting and decides to divert all calls from his voice based wireless information device to voice mail. Alice faces an emergency and must reach Bob. Alice can see that Bob is in an important meeting from the pre-call information he has posted. But she can do one of two things to reach Bob despite Bob's attempt to remain uninterrupted. First, she can send the pre-answer words 'Emergency! Please answer' to Bob's device, which can be programmed to beep or otherwise alert Bob when a message comes through with certain defined key words like 'emergency'. Bob reads that message and then immediately calls Alice. Or Alice could be given by Bob rights to override his call diversion, which she can use at her discretion, with that discretion being exercised appropriately since Alice can see Bob's situation defining information. Override rights can be given to close friends and family and also to emergency services.

As noted above, the subject of an intended telephone call can also be defined by a caller as the pre-answer information. As an example, say Alice and Bob have an argument. Bob might ordinarily try to call Alice, who would likely not answer. With the present system, Bob can open his telephone application on his device and choose Alice from his contacts list; instead of just dialing out immediately, the application can present an on-screen prompt to enter a subject for the call, an indication of its urgency and how long the caller thinks the call might last and to select a suitable graphic. Bob enters into the subject field 'I'm sorry', indicates that its urgent and sets the call time to maximum. He selects a heart graphic. Bob then initiates the call; Alice's device rings and she can see from a display on her device that the call is from Bob, the subject is "I'm sorry", the time duration is set to maximum and there is a heart graphic. The expected time duration is represented by a clock icon (which can show one of several variants, for example, a 'quick call' icon, 'long chat' icon etc.), although the user can alternatively just state in the subject field 'Quick call'. Alice decides it's time to accept Bob's apology and answers the call.

As noted above, the pre-answer information may be sent as data prior to a voice channel being opened, for example as SMS data, a Smart Message or packet data (e.g. in IPv6 or other packet based system. The information is then displayed on the target device, together with various user prompts, including "Proceed with voice call?" and "Post reply message". This data handshake can carry not only information which Alice or Bob have themselves entered into their devices, but also information which the device itself is aware of and is automatically entered; location information is one example of this. This information can be thought of as being 'implicitly entered' by Bob or Alice and references to an entity entering information cover both explicit and implicit entering; hence automatic entering of Bob's location information is an example of Bob implicitly entering that information. The information must however be dynamic (i.e. potentially variable) and hence does not cover persistent information, such as conventional caller ID information.

In another example, say Alice is already on a voice call to Sam; Bob selects Alice's name from his telephone application and a data handshake between Bob and Alice's device follows. This supplies to Bob's device the information that Alice is already making a voice call; if Bob has appropriate access rights, his device is also informed that Alice is talking to Sam and prompts Bob to choose whether or not to interrupt Alice and Sam to join their conversation.

In another implementation, the pre-call information is stored not only at a local device but is also posted to a remote web server, which a calling device may have access rights to poll. In essence, prior to making a voice call, a device connects first to the web server to collect any pre-call information posted there. Similarly, pre-answer information can be posted to the remote web server and be downloaded by a target device. This approach may be particularly attractive in a VoIP system, since the web server could be integral to the VoIP network and a server call is just part of the necessary voice call routing anyway. Further, holding pre-call and pre-answer data on a server (as opposed to keeping it just on a client) allows the data to be seen by one party even when the other has a device which is out of coverage or off/busy. Conversely, where a GSM system is used for the voice call, then a separate connection to a web server to download situation defining information is a considerable extra overhead and the peer to peer system based on SMS or Smart Messaging is preferable.

An alert may be sent to a person when the information describing the situation of another person alters in a way defined by the person. For example, Bob posts a pre-answer message "Please don't disturb" onto his device which Alice then reads on her device when she selects Bob's name from her wireless information device's contacts manager just prior to making a voice call to him. Alice doesn't need to interrupt him. So she programs her device to alert her when Bob's "Please don't disturb" message is removed by Bob. When that happens, Alice is alerted and can proceed to make the call to Bob.

The following extension to the previously described ideas is also within the scope of the present invention: say Bob wishes to speak with Alice about going out tonight. Bob enters as pre-answer information the subject line 'Dinner tonight?' and the quick call duration icon and initiates the call to Alice. Alice is in an important meeting and has set her device to flash an on-screen indication of the subject and caller name of any callers; she sees Bob's name and his subject line. She decides she cannot take a voice call but can take a few moments to send a text response. She then responds to the incoming call by selecting a 'respond with text message?' option, rather than an 'accept voice call?' option shown on her screen's device. She is then given a field into which she can type a message; that message is then transferred as data to Bob's device for display on his screen. Bob responds with his own reply and the data communication is then terminated. The voice call part of the call has not in fact commenced at all—the communication has been handled entirely using text data transfer.

In a second aspect, there is a wireless information device controlled by a calling party and programmed (i) to allow information to be entered into it, the information being of relevance to a call recipient with whom the calling party wishes to communicate, and being of a kind which varies, and (ii) to transfer that information so that it can be read by a second wireless information device controlled by the call recipient; whereby the call recipient using the second device is automatically provided with the information prior to answering or accepting a voice call from the calling party.

In a third aspect, there is software for a wireless information device which, when running on the device enables the device to perform as a wireless information device as defined in the second aspect.

In a fourth aspect, there is a method of generating revenues relating to the use of an application on a wireless information device, in which the wireless information device is as defined above. Calling parties might therefore pay a flat fee (e.g. monthly or quarterly) to their wireless communications provider in order to enjoy the functionality defined above.

In a fifth aspect, there is a method of generating revenues in which a calling party pays to perform the inventive methods defined above. Calling parties might therefore use the functionality defined above on a pay-as-you-go basis to their wireless communications provider.

In a sixth aspect, there is method of allowing a data file to be downloaded, in which the data file is capable of being used as information which is (i) sent by a calling party to a call recipient prior to answering or accepting a voice call from the calling party, and (ii) is of relevance to the call recipient with whom the calling party wishes to communicate, the information being of a kind which varies. The data file can be an icon or animated graphic.

Further details of the invention are contained in the claims of this specification.

DETAILED DESCRIPTION

The present invention will be described with reference to a project from Symbian Limited of London, United Kingdom, called the Voice ++ project. The Voice ++ project has identified two key mechanisms for the enhancement of the mobile telephone experience, namely:

Virtual Presence
Asynchronous communication

Virtual Presence

Virtual Presence offers the user an opportunity to define a virtual identity for themselves. Through customisation of their 'look' (i.e. how they are perceived by another user) they can be more than just a list of numbers in someone else's Contacts list. Callers can see the target's (i.e. call recipient) Virtual Presence in their Contacts list. Targets can see the caller's Virtual Presence. Expressing personality is in itself a highly attractive feature for specific segments of the market, i.e. the Teens. However Virtual Presence is not simply static information of a 'look and feel' nature. It shows not only the personal expression of another user's identity but also has the potential to show a whole wealth of information about the user:

- The user's Mood—(e.g. for a target: 'Don't Disturb', 'Working', 'Out Partying', 'Commuting' etc.—these can encourage the caller to either: call immediately, call later, send a text or voice message, not call at all etc. For a caller: 'Urgent! Please pick up' will encourage the target to pick up).
- Their location—of varying granularity—i.e. 'London N17', 'Sainsbury's—Clapham'.
- Phone Status—i.e. 'Busy', 'Available', 'No/poor network coverage', 'No battery' etc.
- Messages from the caller or target—'Working from home', 'Out on the town', 'Out of the office till 2 Feb. 2001' etc.
- PIM information—i.e. during the day, data available from the Calendar application may indicate which meeting the caller or target is currently in.
- The preferred communication mechanism—as indicated implicitly or explicitly through the Mood and caller Messages etc.
- The Network Situation—i.e. Name of network operator, Call charges at the intended time of the call etc.

With games and Third party applications the attractiveness and usefulness of such a Virtual Presence has the potential to expand greatly.

The Detail

At its most basic level, Virtual Presence offers the caller information about the availability of the target. In turn the target may see more than simply the name of the caller.

By putting his phone into a specific Mood, the target can specify their availability and therefore provide the caller with information about how they would like to be contacted, i.e. 'Only available for text chat' (this automatically suggests the use of text for communication), 'By all means ring me' etc. In addition, the status of the mobile itself can provide the caller with information about whether now is a good time to call, i.e. the mobile may be in 'By all means call me' Mood but the target is currently in a call. The caller may choose therefore to activate Ring Back (See Ring Back Service Description) or simply try again in a few minutes. In this way the caller and target can automatically exercise an element of control over the communications which to date has not been possible.

Illustration:

By the target putting the phone into a "Don't Disturb" Mood, the caller can be prompted to send a voice or text message instead. Depending on how the target has specified the behaviour of 'Don't Disturb' they may receive a prompt (a short vibration) that a message has been left, or no prompt at all in which case the next time they switch out of 'Don't Disturb' Mood they will be notified that messages have been left for them. NB: This should not be taken to mean that a Mood such as 'Don't Disturb' would prevent calls being placed, rather it is simply the case that the target is advising the caller to leave a message rather than call. This degree of functionality alone provides a major part of the control that users are looking for. Depending on the Mood settings they use, the target can leave the phone on, i.e. can use it for their own purposes but can ensure (assuming social protocols are followed—see Social Protocols discussion) that they are contactable as and when they want to be and in the manner that they choose.

At the most basic level therefore, the mobile telephone can ship with a small core set of Moods which the user can easily switch between much in the same way as mobiles currently offer a core set of profiles which (in the main) control the physical behaviour of the phone.

Taken a step further however the customisation of these Moods by the caller and also the target enables them to extend their Mood into a rich Virtual Presence rather like Avatars available on the Internet (i.e. with variations of ring tones, graphics, animations, messages etc.) Both parties can offer rich, dynamic and fun information. In the same way that Ring Tones and graphics can be downloaded, supporting Avatar type data could also be available. While it is suggested that the mobile ships with a small core set of Moods, it is likely that users will develop several Moods with the same underlying preferences but which display quite different Moods, i.e. Meeting and Clubbing. In both instances the user might not want any communication other than text but the information provided for the caller (or target) implies radically different states.

Users would likely be keen to provide a virtual representation of themselves. Behaviour on the Internet suggests that some segments will make a great deal of effort in creating a Virtual Presence. While this behaviour is indeed PC based, in the main we can already see such personalisation behaviour occurring in the mobile space too. As described above some segments of the market will go to great pains to personalise their phone, with ring tones, hard covers and on screen pictures. Given an easy customisation environment some segments of the market will extend this behaviour to the mobile virtual world. Users are already using their mobile to make effective use of 'Dead Time' by the creation of text messages and fiddling with settings. With appropriate functionality it is highly likely that the desire to 'play' with their Virtual Presence will be equally attractive. This factor encourages the creation of new Moods which not only provide users with a more meaningful presence and greater control of their mobile but also inherently provides users with a far richer standard of Pre-call and Pre-Answer information. Ultimately the Internet and mobile based Avatars will probably merge and a user will have a Virtual Presence the complexity of which is purely dictated by the viewing device and its settings.

Social Protocols

The value of Moods is to some extent dependent upon adherence to the social protocols that such a service implies (i.e. the need for the caller to respect the Mood indicated by the target and to behave accordingly, and vice versa) These social protocols are already well established in face to face communication: the demeanour of the target can be perceived and judgements made by the person about to initiate the communication as to whether or not now is a good time. These protocols are recognised and as relationships get established people know the extent to which they can break these protocols. Moods simply provides a similar degree of information in the virtual space.

The Avatars visible to the caller and target may in fact be tailored. Applications which can reflect the relationships with contacts facilitate the development of emotional messages (See EvolvIcons Service Description). Pre-call and pre-answer information can also grow as the relationship grows or could dictate that specific callers are always sent to Voice-Mail. People customise their Instant Messaging presence according to who can see that presence information and some people will spend time customising ring tones etc. for specific people. It is predicted that, for key individuals in particular, users will personalise their Virtual Presence too.

Clearly there will be instances where it is desirable to over ride the Mood specified by the target (i.e. in emergencies a caller may ignore the request for text only and may still place a phone call.) It is not the intention of Voice ++ to suggest that Moods are enforced: there are always exceptions to the Moods and the target would be unwise to create a Mood which prevents an emergency call from reaching them. The Moods are there as recommendations to the caller. And the target can always make use of features such as Hold (see later) to take back some of the control. The extent to which the target insists that the Moods are adhered to is down to individual personality. It could for example be encouraged through the addition of a short message accompanying a Mood, (i.e. if in 'Don't Disturb' Mood, the target may also add a text message as part of their Virtual Presence which says "and yes I do mean it ☺"), a message that everyone (or specific violators of the metaphor) see.

Asynchronous Communication

Users already engage in large amounts of asynchronous behaviour. Text messaging is widely acknowledged as a major use of the mobile phone. Despite the tedious nature of inputting the text itself, users still engage in brief, asynchronous chat. It is seen in use not only during 'Dead Time' when a call is inappropriate or impossible but on occasions when an entire conversation is unnecessary or undesirable. Being able to transfer information at a point in time convenient to the user places the user back in control of their mobile. This chat takes a variety of forms being anything from inane chatter about what they are doing or have done to the transfer of information i.e. a phone number, location instructions etc. to another person.

The spoken nature of voice messaging provides the user with an even faster means of having these asynchronous 'chats' with other people, although clearly there will be situations where text is still preferable. However, with the development of speech to text technology, voice messaging could at the very basic level simply be viewed as the input mechanism, i.e. if the caller is in 'Text Only' Mood this message could be turned into text. Nuance and intonation forms a key part of aural messages and this would be lost in current conversion techniques, therefore, forcing the conversion as part of a Mood may not be desirable.

A key issue for the user experience in the creation of asynchronous data, be it verbal or textual, is that it should not be tied to any specific application on the mobile. We naturally multi-task and the creation of a 'Doodle' (see later) in one location on the mobile for example should not prevent that easily becoming a text message.

What This Means for Voice ++

The following Services are of key importance in the fulfillment of the aspirations described above:

Virtual Presence:
 Pre-Call—encompassing various elements including: Moods; Convert To Text, Phone Status, Doodle, Information Management, Ring Back, plus Avatar type data etc.
 Pre-Answer—encompassing various elements including Moods; Convert To Text, Doodle/Post, Information Management, Advanced VoiceMail including: Call Screening, Pause/Play/Reply to VoiceMail and Hold as well as Avatar type behaviour.

Asynchronous Communication:
 Voice Messaging
 Doodle.

These two areas satisfy the key requirement identified during the Voice ++ research, namely enhancing the call experience such that the user perceives themselves to be in control of their mobile telephone.

Service Descriptions

The following Service Descriptions satisfy the key requirement identified during the Voice ++ research namely the establishment of user control over their mobile telephone. See Appendix A for all other Service Descriptions.

Pre-Call and Pre-Answer: General Points

Currently both the caller and target experience is quite impoverished. At best the caller can make suppositions about the availability of the target, i.e. "It's 9:30 am, they should be in the office by now". In this instance, there is no way for the caller to determine the validity of their assumptions without actually placing the call. Similarly the target will at best be able to see the name and/or number of the person calling. If the target can see the caller ID, they may try to base their decision of whether or not to accept the call on: possible reasons for the call; the importance of the caller; guessing the call subject matter; their own convenience (amount of time they have to take the call, where they are when they receive the call) etc.

Other communication types have richer information:
 face to face—visual cues indicate physical availability of the individual and their readiness to communicate;
 written communication—while the immediacy of the communication is removed and availability less of an issue, the user has access to additional sources of information and, through its asynchronous nature, has time to think about the communication.

Pre-call and pre-answer offer respectively the caller and the target the opportunity to have a far richer call experience, enabling them to make informed decisions when making and taking calls. In some cases it may even alter the communication, replacing it with alternatives or stopping it altogether at that time.

Pre-Call

Current Stories:

1. Helen is about to leave the office and wants to call Steve and to tell him that the plans for the evening have changed and to ask him what time he will be able to meet her. She selects Steve from her contact list and initiates the call. Steve is in a meeting and has switched his mobile to Silent mode. Helen is bumped to VoiceMail and has to leave a message asking Steve to call her when he has a minute.

Pre-Call means that when about to make a call the caller can see the Virtual Presence of the target. Steve could have put his mobile into "Text Me" Mood and Helen would have seen this and contacted him appropriately, getting a response to her question without significant interruption to his meeting.

Pre-Call may include any of the following types of information in addition to the fun, Avatar type visualisation discussed in previous section.

Availability Information:
- Mood Status of the target—i.e. 'Don't Disturb', 'Working', 'Out Partying', 'Commuting' etc.—these can encourage the caller to either: call immediately, call later, send a text or voice message, not call at all etc.
- Location Status—of varying granularity—i.e. 'London N17', 'Sainsbury's—Clapham'.
- Phone Status—i.e. 'Busy', 'Available', 'No/poor network coverage', 'No battery' etc.
- Target Messages—'Working from home', 'Out on the town', 'Out of the office till 2 Feb. 2001' etc.
- PIM information—i.e. during the day data available from the Calendar application may indicate which meeting the target is currently in.

In addition the caller may also see information from their own device pertaining to the call.

Supporting Information:
- Doodles—written by the caller on a previous occasion regarding this caller, i.e. 'Remember to ask x' etc. or taken dynamically from the Calendar application i.e. 'Daughter's birthday on 22 Feb.'. (See Doodles Service Description).
- View previous communications with the target (see Information Management Service Description).

The caller may also choose to actively provide the target with more information, for pre-answer i.e. entering a call subject, or using flags to indicate whether the communication as 'Urgent', or 'Chat' etc. This expanded on in the next section.

Pre-Answer

Current Stories:

1. Sarah is in a meeting but has emailed Clive asking him to ring her with some information. She would be willing to accept the call should it occur during the meeting. Sarah's mobile rings during the meeting and she can see that it is Clive. She excuses herself from the meeting and accepts the call. When she speaks to Clive it transpires that he hasn't received her query yet, he was simply calling to see if she would be joining the rest of the team in the pub later.

2. Richard is in a meeting and his mobile rings; the caller ID indicates that it is his wife, Judy. She usually rings him at the office during the day just for a quick chat, so he decides to bump her call to VoiceMail and get back to her when he has finished the meeting. Judy is upset as their son's school has just phoned asking them to come in to see them that evening; she is forced to leave him a message telling him that she needs to talk to him a.s.a.p. Richard leaves the meeting an hour later and finds the distressed message calls Judy back immediately.

Pre-Answer means that when a call comes in, the target can see the Virtual Presence of the caller. By flagging a call as urgent or simply allowing the text message to come through Richard would have realised the significance of the call and probably chosen to take it, whereas in Sarah's case she may have chosen to 'bump' the call to voicemail as it was purely social.

Pre-Answer may include any of the following types of information in addition to the fun, Avatar type visualisation discussed in a previous section.

- Name of the caller.
- Location of the caller.
- Mood Status of the caller—this may in itself provide clues about the reason for the call, i.e. 'Partying', 'Working'. The more that callers customise their Virtual Presence the more meaningful the information to the caller i.e. 'Out Clubbing', 'In Meeting' etc.
- Specific subject/status information—this may have been specifically entered by the caller to help the target or have selected it from a pre-canned list i.e. 'Urgent', 'Chat', 'Work' etc. It could also be gleaned from PIM/Smart data, i.e. if the call is initiated from within a specific text message or from a calendar entry—the first few words could be visible to the target. The extent to which the caller will bother to provide such information is dependent upon both the personality of the individual caller but also the ease with which such information could be added.

Supporting Information:
- Doodles—written by the caller on a previous occasion regarding this caller—i.e. "daughters birthday", "remember to ask x" etc. (see Doodles).
- View previous communications with the target (see Information Management).

The target is not only in a better position to choose whether to accept the call but to decide the way in which they accept the call. For example, they may choose to screen the call—listening to the message being left on their VoiceMail (See Call Screening Service Description) and then decide whether to answer or not. They may choose to put the call on Hold initially (See Hold Service Description) so that they can get into an appropriate location to answer the call or so that they can view/listen to their own Doodle prior to taking the call so that they are better prepared for the call. They may simply answer or ignore the call as currently.

Convert To Text

Currently when a call is received the caller can do one of three things: accept the call; forward the call to VoiceMail or let the mobile ring out and automatically forward to VoiceMail. Alternatively, if the mobile is off or out of range then the caller is automatically forwarded to VoiceMail. In all but one case the communication ends even though there may be various reasons for not taking the call, i.e. a noisy pub or in a work meeting.

Convert To Text offers the target the ability to manage the manner in which other people contact them. This may take the spontaneous/reactive route whereby during Pre-Call the target indicates to the caller that a text communication is preferable. Alternatively it may be that the target puts their mobile into a 'Text only' Mood because they know they are going to be in a meeting or in a noisy pub etc. Hence, a caller should then contact them via text or, if they go ahead despite the pre-call message and place a voice call, then the target can automatically respond by inviting the caller to participate in text communication.

Current Stories:

1. Bill is in a club with his friends. His girlfriend, Michelle, phoned him earlier to say that her train is running late and that she will be later than planned. She has agreed to call him when she arrives at the station so that he knows when to look out for her. The club is typically noisy and when Michelle phones, Bill repeatedly has to shout that he can't hear what she is saying. In the end he has to run to the cloakroom, stick a finger in one ear and try again.

2. Tony is on the train home and his wife calls him, as always, to determine what time to meet him at the station from work. On occasions people 'tut' at him or frown at the noise from his conversation and just occasionally he gets a bit of an earful from his wife about the fact that he is running late, and he then has to go into a lengthy explanation, something that he would rather not do in front of a crowded train. Regardless, he needs to tell her when he is leaving so that she can be at the station to pick him up.

By being able to switch an incoming call to text (Story 1) the target can take the call in a way that suits them. Alternatively by automatically putting the phone into a Mood whereby the caller can see that they would prefer to be contacted by text, the communication can automatically commence in the format suited to the target (Story 2). The addition of Location information as part of the Virtual Presence may even provide sufficient information to remove the need for the communication (Story 2).

Call Screening

Users already screen messages as they are being left on land line answering machines. This service replicates that functionality on the mobile. The user is able to listen in on a VoiceMail as it is being left and can interrupt and take the call or to stop listening and let the caller continue to leave a VoiceMail. In addition, poor and non-existent mobile coverage is highly irritating for both the user when downloading material to the device or when listening to VoiceMail. Text messages are sent to the mobile when there is sufficient coverage: the same could be the case for VoiceMail enabling the user to listen to messages even when coverage is intermittent.

Current Stories:

1. George is sat in an important meeting when his mobile vibrates. He can see that it is his son Thomas ringing. He is unsure about the importance of the call but as he knows that Thomas should be on his way home from school he thinks that he ought to take the call, just in case. George excuses himself from the meeting and takes the call only to find that Thomas is calling simply to tell him that he scored two goals during football practise. George has to cut his child short and returns sheepishly to the meeting.

Ideally George would be able to start listening to the call, decide that it is better to speak to his child later when he can dedicate his full attention to the him.

Hold and Mute

As mobiles can be used practically anywhere and people are increasingly unwilling to turn them off, it is not uncommon to hear a mobile ringing in meetings or a restaurant or cinema etc. Occasions when it is inappropriate to some targets and certainly inappropriate for the people around them. Nor is it unusual for it to ring just at the wrong moment i.e. when 'working from home' just as the shop public address pages a member of staff. Our research has shown that people frequently conceal the truth about where they really are. Trying to take a call when in an awkward situation frequently results in one of two activities "Hang on I'll call you back in one minute" or the target continuing the call and then proceeding to give the caller a running commentary of their antics while trying to get to a convenient location to take the call. Users want to be able to mute the audio of their handset while still being able to hear the call, or place the call on Hold initially before they accept it so that they can get into a location convenient to start the call. This could be easily activated in the same way as Hold is currently activated once in a call, i.e. using a prolonged press of the call answer button or double clicks of the call answer button etc.

A progression from putting a call on Hold is changing the communication mechanism to one that is appropriate i.e. text (see Convert To Text Service Description).

Current Stories:

1. Tom is on the train in a quiet carriage. He doesn't like taking calls in public areas like this, as he feels it is inconsiderate. On this occasion he forgot to turn his mobile off and when it rings he is mortified and frantically hunts through his pockets to locate his mobile and "bump" the call. As he pulls it out of his pocket he can see that it is his wife calling. He wants to take the call but does not want to shout in the train carriage. He answers the call so that she doesn't get bumped to VoiceMail, but then has to start the conversation with "hang on I'm just having to move so I can talk to you" followed by several minutes of fumbling and apologies to fellow passengers while he climbs over them to get to the end of the carriage.

2. Richard is supposed to be working at home, against a deadline. He has decided to take a break and go to Tesco's for some grocery shopping. Whilst in the shop, his phone rings and the caller ID indicates that it is his boss. Richard reluctantly answers the phone and quickly answers his boss' questions, hoping that his boss will not hear the other shoppers in the background. Suddenly, a staff announcement is made and Richard has to cover the phone's microphone so that his boss does not hear the announcement. The call ends, with Richard still wondering if his boss has figured out where Richard was.

In both scenarios, a 'Hold and Mute' function would have been far preferable.

Asynchronous Communication

Voice Messaging

Asynchronous behaviour is already a significant part of user's mobile behaviour. The ease with which verbal messages can be created means that it is a natural extension of the text messaging behaviour. The user should be able to create voice messages and send these directly to another person's VoiceMail without the caller being any more aware that this has happened than is currently the case with text messaging.

It should also be possible to simply change data from one medium to another. (i.e. a voice note into an text message, a Doodle into an text message etc.). Data should be independent of the mechanism by which it is delivered: Doodles, text or voice recordings can in the right situations form appropriate content for personal notes or the content of messages to others.

The teen market view SMS as an ideal way of communicating with their friends. Communicating via text is for them a means of communicating in private (something which can otherwise be difficult both at home and school) and voice SMS will enhance the speed with which they can do this. The need for privacy rather than speed is likely to be the determining factor when people are choosing between text or voice as the creation mechanism.

Current Stories:

1. Susan is on her way out of the house when she remembers that she needs to call her mother to and confirm dates for her visit. She is in a rush and knows that if she calls it will be difficult to keep the call short. On this occasion Susan decides not to make the call.

If she had been able to simply record a quick message to her mother, she would have removed the worry of forgetting to pass the information on and would be able to make a more leisurely call at her convenience. 'Urban Socialites' particularly want to be able to off-load information at a time convenient to them. At present they may leave making the call until they know it is not likely to be answered or may simply avoid calling all together.

Doodles

It is not uncommon to make a call and on ending the call to remember something else that you wanted to mention. Depending on the person you have just called you may choose to call them back and continue the conversation. However there are factors (such as time, status of the person being called, whether or not you will get the same person the next time you call (i.e. a call centre), personal confidence etc.) which determine whether or not it is a good idea to call again immediately. Similarly, when in the middle of a call it is not uncommon to see people scribbling notes or doodling on the back of a nearby envelope. These are activities that may or may not be connected to the call itself. Some people claim to "think" better if they are doodling aimlessly at the same time as talking. Information exchange is a common reason for a call, and in some instances this may result in information that ideally they want to record in some way.

As headsets, particularly Bluetooth headsets arrive, the need for the mobile telephone to be held to the ear is removed. This frees up the interface of the screen for services that will enhance the call experience. Doodles offer the user the ability to associate data with a communication. At present users employ a number of techniques such as sending themselves text messages as reminders or sticking adhesive notes to the phone, such processes assume that i) the user remembers to look at text reminders and ii) that the note is still stuck there.

By associating the Doodle with the communication, i.e. the Contact, (ideally converting voice to text—unless operating with a headset) it would be possible to have reminders as part of Pre-Call and Pre-Answer. It should also be possible to view and add to the Doodles while the call is in progress, replacing the need for a notepad.

Adhesive notes are often left on a colleague's desk or are left around at home for other members of the family. They are either for the exclusive benefit of the other person (i.e. "your mother called at 3:30 pm"), or for the use of both (i.e. "run out of milk and bread"). It should therefore be possible to send Doodles to other people (e.g. converting them to text messages). The difference to just sending a normal text message is that you can retain a copy and the appropriate "linking" of that Doodle if so desired. It should also be possible to share a Doodle with other people. Doodles can be voice as well as text and could ultimately be multimedia.

Current Stories:

1. John has been trying to get through to his bank for a number of hours. He has a couple of queries for them. While in a café for his lunch break he decides to try again. It is only after he has started the call that he realises that the adhesive note he wrote to himself is back on his desk. The bank answers and he gets answers to two of his queries, he knows there was a third question but he can't remember for the life of him what it is. After a few embarrassing moments of dithering he knows he is not going to remember the third point and he ends the call knowing that he will have to call the bank again later.

2. Matthew is in the pub with friends when he remembers he had intended phoning his sister Joanna to ask for the mobile number of the restaurant that she had recommended he take his girlfriend to. Matthew is standing outside the pub entrance where it is quieter and makes the call to Joanna. Joanna tells him the mobile number and Matthew repeats it hoping that he will be able to remember it until he gets back to the table where he can shred a beer mat and write the number on it for use later.

3. Tom and Sally are having friends round to dinner in the evening. Whoever gets home first needs to pop round to the corner shop to pick up a few last minute ingredients. They leave an adhesive note at home so that whoever gets in first can take it back out with them. On his way home, Tom passes a convenience shop and thinks that he can remember all the ingredients. However, he doesn't know a) whether Sally is home already and has therefore bought the ingredients already, b) that he has really remembered everything.

Being able to capture information on the mobile (either through voice or text—the former being preferable) enables users to transfer behaviours that they can easily do currently on a landline where paper and pens are likely to be at hand. In this instance however they can carry this data with them in the form of a Doodle without risk of loss (unless the mobile itself is stolen too) and can even be associated with other information.

In the last Story Tom could: use the Virtual Presence to determine Sally's whereabouts, phone her to check whether she has bought the ingredients or more conveniently look at the shared list and see whether she has added a comment showing that she has bought everything already.

Conventional applications such as Jotter and Notes provide the user with a mechanism for making notes in support of call activities. However, this relies on the user remembering that this note has been made and it requires them navigating to it in a timely fashion for the call. The advantage of Doodles is that the information can be created anywhere and associated within any relevant location. This may occur in one of two ways:

1. Automatically—creating a Doodle while in a contact detail view could associate that with that particular contact such that should that contact be accessed in the future the Doodle will automatically appear too.

2. User choice—the user may create the Doodle in one application and choose to save it to another association, for example a Doodle created during a call could automatically associate it with that contact; alternatively the user could choose to save it in the to-do list or as part of a calendar entry as a reminder.

In either case, establishing links ensures that the data is available when it is needed. As in the case of Scenario 1, the caller can associate the questions for the banker with the banks call centre details, he can add to these during the call and retain a far more detailed record of the call (and all in the same location). Note: Data captured in this way may form part of another piece of device data, i.e. if as a result of the call to the call centre John has arranged an appointment with a bank manager, the notes made during the call could become associated with the calendar entry also so that he has all the information at his finger tips without having to hunt around for it. In addition a Doodle may simply be a link to data elsewhere on the device. To the user it appears as a Doodle but actually it is content that has been flagged in another location i.e. the content of an email, or the section of a document etc.

In the same way that a user can have layers of physical adhesive notes overlapping and linking to each other in a physical manner, the same is the case for the electronic equivalent. Doodle can be linked to form a montage.

In addition, the advent of the Bluetooth headset increasingly frees up the devices' interface for such activities such that the use of Doodles is viable not only prior to a call but also during it: Doodles can be played as calls come in if the user Pauses the call prior to speaking to the caller.

While Doodles have a key user benefit for the person creating them, there is also the flip side of the behaviour in that they are often given to other people. For example in Scenario 2, Doodle would have enabled Matthew to create an electronic record of the number as Joanna gave it to him. However they would also enable Joanna to help him out, i.e. by sending him a Doodle which not only contained the information but also an association information that it came from her. At which point Matthew would be able to choose to either leave the information associated with his sister or make it into a contact entry in it's own right. (Clearly she could simply send him an SMS without the association. In some instances this is more appropriate though for example a colleague sending a Doodle reminding the caller to bring a document to the next meeting could be usefully associated with the actual meeting in question).

The ability to share Doodles requires the hosting of the data in a central location rather on the device in order to prevent conflicts when data is being updated by either party. The underlying premise of a shared Doodle is that it is available to both at all times and that both parties can edit it: it is not necessary for either to own it.

Play/Pause/Reply to VoiceMail

Currently the extent to which users can interact with their VoiceMail is along the lines of playing the messages and deleting them and setting preferences for how VoiceMail notifies the user of messages waiting. Ideally VoiceMail should enable the user to play individual messages, pause them and enable them to carry out tasks as a result of individual VoiceMails without having to listen to the whole lot again. At present listening to a succession of VoiceMails requires paper and pen, good coverage and patience.

Appendix I—Other Service Descriptions

Picture Messaging

This relates to the ability to send and receive (and create) visual messages—graphics or photographs. While in the first instance simply being able to download pictures from the web onto the device and send these as images within a text message is sufficient, it is increasingly likely that users will want to take pictures and draw their own. To then be able to make additions and alterations to existing images and photographs and to attach sound bites to them is essential. While there are clear work contexts for such a service, use in the social context is likely to be wide spread and given the often superficial nature of many text messages currently it is fair to assume that the use of pictures will follow a similar line and the ability to annotate these will possibly enhance this.

EvolvIcons

The ability to present Moods in the virtual space lends itself to the development of applications which can build on the user's avatars and enable them to develop emotions as well as simply personal animations, sound and graphics.

Being able to send emotions as well as pictures, sounds etc. counteracts some of the sterility of such static communications as text messages. In the first instance being able to annotate and doodle over images and photographs which are being sent to other people is fun, but being able to attach meaning to these of a non textual nature is even more aesthetically compelling.

Applications which can reflect the relationships with contacts in the user's phone facilitate the development of not only emotional messages as described above but also in the extension of the Moods idea in that Pre-Call and Pre-Answer data can grow as the relationship grows and can be customised on an individual level. People customise the Instant Messaging Presence dependent upon who can see that presence information. It is likely that people will also spend time customising their Virtual Presence for key individuals.

Information Management

The mobile already holds a significant amount of information. It contains all the contact information and some devices enable the inclusion of additional textual information, including the text messages and email messages received to and sent from the mobile telephone.

As mobile functionality increases the amount of information that can be made available is potentially huge. In certain circumstances this information can be of value to the user prior to or during a call. The all inclusive term Information Management may include:

Communications to and from the Contact.

Number of calls and the cost of the calls to the Contact.

Meeting entries associated with that Contact.

The last communication with a contact.

The next meeting scheduled with a contact.

The agenda for the last meeting with a specific group.

So providing the user with the ability to use and search this data can provide them with far more information in their communications. The presentation of such information is system initiated in the case of Pre-Call but user initiated during a call.

Ring Back

If when a call has been placed, and the caller is already in another call, the caller can initiate Ring Back which offers the ability to specify that when the line becomes free a call between the two parties should be automatically initiated. This replicates functionality already available on land lines.

If via Pre-Call the caller can see that the caller is currently on the mobile, the caller can initiate Ring Back without needing to first place the call.

Appendix II

Presence: architecture aspects

The realisation of a Presence/Voice++ system will require an architecture for instant messaging and presence awareness/notification which includes: a concept of identity, authentication, access control, encryption, message integrity and shared content.

Identity

Clearly, identity is essential: individuals will use several devices of different types, and capabilities, requiring an effective and efficient addressing system to handle and simplify the multitude of email addresses, phone numbers and www-addresses for individuals, groups and organisations. This may also necessitate some form of classification of the basic modes of communication to help define the basic requirements for applications, devices and service providers. Importantly, individuals may wish to assume several different 'Identities', for communicating within different contexts.

Actor/Personae
- An Actor has 1 to n Personae through which they communicate with other Actors. i.e. communication is Persona-to-Persona based rather than Actor-to Actor based.
- The Actor 'owns' the data/information/files in its Personal Universe but provides restricted views/access to it through their set of Personae.
- In addition, each Persona has values for a set of Persona-based attributes associated with it (e.g. Nickname, font for chatting, icon for Avatar, etc. as well as a Persona Personal File containing their 'history'—schools, hobbies, clubs, likes, dislikes etc.)—this must be extensible so that communities of Personae may be set up, each containing their own distinct community-based information—e.g. a multi-user game which requires Persona to have certain attribute/value pairings for such things as Strength, Agility, Life, Bullets, etc.
- Each Persona is uniquely identifiable such that it can act in end to end communications. This should not be device specific as the ID provides a means of communicating with the Persona not the method. Initially users will be given choice of communication methods (phone, email (work/home) etc.) and will make the appropriate choice given the set of presence and availability information. Later systems may route a message (with appropriate translations—voice/text text/voice etc) to the appropriate device depending on the availability policies set up by an individual.
- It is the Personae that appear in Directory LookUp services.
- Each Persona has its own Presence Information.
- One persona is the Master Persona that is the true representation of the Actor. This may be an authenticated/signed persona.
- A Persona may be anonymous.

Presence

In its basic form Presence enables people to communicate with each other in the most appropriate and timely fashion. It should be possible for this presence information to be refined with levels of availability (e.g. 'away from device but back soon', 'do not disturb', etc.). Some of these refinements should be understood by the software so that they behave in appropriate ways while others may simply be displayed to other clients in a human readable form for them to decide how to respond.

An Actor should not need to maintain presence information at all times on all known contacts. Instead they should maintain a 'buddy list' with their favourite contacts. Presence information can be maintained by 'subscription' whereby changes are pushed to interested parties or returned when specifically requested (by a 'watcher' or 'poller'). An Actor may only want subscriptions to be possible to selected other Actors/Personae.

Presence information comprises dynamic information such as location and availability, etc., which typically has expiration data that needs to be enforced. Initially, at least, availability will be inferred from the recipient's published mood and the status of the device.

Availability
- A property of a Persona denoting its ability and willingness to share information about itself or to communicate with another Persona based on factors such as:
  - the type of communication requested;
  - device availability and status (out of coverage, downloading data, etc.)
  - the identity of the calling Persona;
  - the mood of the recipient;
  - the preferences and policies that are associated with the recipient.

Mood
- A setting which allows the user to provide an indication of their state of mind. This is likely to provide not only their state of mind but an indication of their availability and a preference for how they want to be contacted. I.e. If 'Angry' and 'Busy' the user may have specified that this means they are only available for chatting in text form.

Location
GPS (absolute and translated).
Bluetooth Pods in offices etc.
Text (e.g. 'Down the White Horse').

Architecture

Client/Server.
- An Instant Messaging and Presence (IMP) Server holds master copies of Presence information and other Personal Data (Personal Universe).
- Personal data could include such things as: MP3 files; photos; credit card details; DoB and other auto from fill stuff; medical records; Agenda; Public PGP key, etc. i.e. file, record and transaction based shared content.
- The server listens for client connections and communicates directly with clients and other servers.
- The server also handles: data storage, user authentication, directory lookups (e.g. LDAP) and Rosters, etc.
- The client communicates with the IMP server, parses and interprets well-formed XML packets and understands message data types.
- Each Actor and their set of Personae is associated with a single server which receives information for them and from them.
- Clients make a single connection to their server over which all communication exists.
- Distributed communication happens client→server [→server]→client.
- The servers transfer messages and presence information between themselves and, with the appropriate interoperability standards in place (e.g. SIMPLE), with other external IM and presence systems too.
- When a Persona's Presence or other Personal Data changes (either explicitly by the Persona, or implicitly by, for example, a timeout, the IMP server is updated.
- For Presence information this may be very simple in the first instance, aided by a set of profiles for ease of use, or an enumerated set for programmatic processing plus a text field for additional information.
- Individuals hold cached copies of other's Presence information (and other information—probably more static in nature). This is just for Buddies but may wish to view available public presence information on anyone: Anonymous Presence Request.
- When a buddy's presence information or Personal Data changes, and if they are permitted to access the particular data that has changed, and if they have subscribed to that data, they are informed. The changes will either be pushed or pulled depending on subscription model. Pushed changes will be immediate whereas pulled changes will be retrieved when the server is next polled. Could force a push.
- The Presence Data could be time-stamped with when the information was last updated.

Data Format/Protocols

Client/Server protocol (preferably an open XML-based standard). Used for client-server, server-client and server-server communication (session initiation, modification and termination).

Server-to-server protocol—could be proprietary between homogenous systems but will probably be SIP/SIMPLE for interoperability between heterogeneous systems.

Data representation protocol: a fundamental requirement of the architecture is that it must be extensible. As such, an open XML-based standard protocol should be used for packaging/transporting data (IM, presence data and personal information). The protocol should use XML Namespaces to encapsulate other kinds of data sent, allowing any client, server, transport, or any component of the architecture to build custom applications by including their own XML data within their namespace. Could be SOAP.

Messaging

Messaging is essentially the sending of some data from one Persona to another. The data is not restricted to text, but may be any well-formed data that can be recognised by clients including text, voice, multimedia, Presence Information, etc.

Common standards for these data types coupled with a common standard for their transfer (described above) will greatly ease the development, roll-out and adoption of data services and applications that build upon this architecture.

One application of this is Instant Messaging, which will be enhanced by both the richer Presence Information available and the support for other more complex data types over and above the simple text of current systems.

Not just person to person messaging: application to application messaging will also be possible, possibly using SOAP.

The inherent extensibility of the architecture will allow new data formats to be supported.

Security and Privacy

Privacy

White Pages should be an opt-in subscription model, allowing the user the choice of whether or not to publish their information.

The use of server and client-side filters would give users the ability to deny communications by user, domain, message type, or content, etc.

Authentication:

Simple username/password system.

Digest authentication.

Digital signatures.

PKI

Encryption

PGP or S/MIME . . . authentication is a must but encryption, although provided, should be optional—user does not have to use the feature.

Secure Connections

SSL (Secure Socket Layer) can be used to create a secure connection between the client and the IMP Server to ensure that usernames, passwords and messages cannot be intercepted.

IPSec

Transports

Protocols should be transport-independent: HTTP, WAP, SMS/MMS, etc. . . .

Namespace & Addressing

Globally Unique ID

Or Domain-based: node@domain.com. Example: MyPersona@indirect.com

Directories and User Management

Along with a flexible messaging and presence system, an XML-based directory should be provided.

As to account management, the server by default will allow every user to have full control over the creation of and management of their account. This includes passwords, and all presence, personal data and messaging aspects. Server administrators have full control over the rights allotted to each account, and can remove or limit those at any time.

PreAnswer.

Using the architecture described above current GSM Systems could support some form of Pre Answer:

Post

1. Before calling, a caller posts Caller Information onto the server (using, for example, SMS);

2. The caller then makes the call. Before it rings, the Callee's phone makes a data call to the server and requests 'Call Information' for the Calling 'Persona'.

3. This is then displayed, and the phone rings.

However, as well as being burdensome and particularly prone to latency problems, it has security implications as well—how to restrict only the Callee from accessing the Call information.

Supply

Another method would be to simply 'handshake' using messages (SMS, EMS, or MMS) to carry 'Pre Answer' information payload (based on a standard for such data).

1. To initiate a call, a caller sends the Callee a 'Pre Answer' message that the Callee's device recognises.

2. On receipt, the Callee's device alerts the Callee and displays the 'Pre Answer' information. The Callee can chose to ignore, accept or return a message.

3. If the Callee wishes to accept, then a return 'Accept' message is returned which the Caller's device recognises and promptly initiates a phone call to the Callee.

This is also burdensome and prone to latency problems, though not as stark as in the previous solution.

However, networks are moving towards wholly IP-based infrastructures and the adoption of the SIMPLE (SIP for Instant Messaging and Presence Leveraging Extensions) protocol as the standard interoperability protocol and the widespread support it enjoys (from, for example, AOL and Microsoft) may accelerate the process. This will provide an ideal infrastructure for rolling out such features as Pre Answer, the ability to move seamlessly from one type of session to another (data to voice for example), establishing conference calls, and so on.

In such an environment, and assuming SIP/SIMPLE and the architecture described above:

1. The caller would establish a communications session with the desired party. Initiating a session simply requires determining where on the network an invited party is at a particular moment (using the policies/mechanisms described above). Once the invited party is located, SIP delivers a description of the session (which among other data, includes the type of session desired, in this case 'Voice', and the 'Pre Answer' information) to which the person is being invited. The most common protocol used to describe sessions is the SDP (Session Description Protocol), described in RFC2327.

2. Once the person is located and the session description is delivered, SIP is used to convey the response to the session invitation (accept/reject). If accepted, the (voice) session becomes active.

3. SIP can be used to modify the session (e.g. switch to video, or data).

4. Finally, SIP can be used to terminate the session.

The invention claimed is:

1. A method comprising:
    receiving a predetermined indicator on a called party's communication device, said indicator being transmitted from a calling party's communication device as part of a call between said calling party's communication device and said called party's communication device,
    overriding a non-interrupt setting on said called party's communication device in response to receiving said predetermined indicator, wherein
    said predetermined indicator causes an alert to be issued on said called party's communication device announcing the receipt of said predetermined indicator.

2. The method of claim 1, wherein said predetermined indicator comprises an emergency flag that announces on said called party's communication device the existence of an emergency.

3. The method of claim 1, wherein said predetermined indicator comprises an urgent flag that announces on said called party's communication device the existence of an urgent matter requiring prompt attention.

4. The method of claim 1, wherein said non-interrupt setting comprises a call-diversion setting.

5. The method of claim 4, further comprising, upon issuance of said alert, presenting the called party with an option to receive said call despite the call-diversion setting on said called party's communication device.

6. The method of claim 1, wherein said non-interrupt setting comprises a call-blocking setting.

7. The method of claim 6, further comprising, upon issuance of said alert, presenting the called party with an option to receive said call despite the call-blocking setting on said called party's communication device.

8. A system comprising:
    a transmitter transmitting a predetermined indicator to a called party's communication device from a calling party's communication device as part of a call between said calling party's communication device and said called party's communication device, said predetermined indicator overriding a non-interrupt setting on said called party's communication device and causing an alert to be issued on said called party's communication device announcing the receipt of said predetermined indicator.

9. The system of claim 8, wherein said predetermined indicator comprises an emergency flag that announces on said called party's communication device the existence of an emergency.

10. The system of claim 8, wherein said predetermined indicator comprises an urgent flag that announces on said called party's communication device the existence of an urgent matter requiring prompt attention.

11. The system of claim 8, wherein said non-interrupt setting comprises a call-diversion setting.

12. The system of claim 11, further comprising:
    means for presenting the called party with an option to receive said call despite the call-diversion setting on said called party's communication device, upon issuance of said alert.

13. The system of claim 8, wherein said non-interrupt setting comprises a call-blocking setting.

14. The system of claim 13, further comprising:
    means for presenting the called party with an option to receive said call despite the call-blocking setting on said called party's communication device, upon issuance of said alert.

15. A computer readable medium storing instructions, said instructions being such that when processed by a processor configure said processor to:
    receive a predetermined indicator on a called party's communication device, said indicator being transmitted from a calling party's communication device as part of a call between said calling party's communication device and said called party's communication device, and
    override a non-interrupt setting on said called party's communication device in response to receiving said predetermined indicator, wherein
    said predetermined indicator causes an alert to be issued on said called party's communication device announcing the receipt of said predetermined indicator.

16. The computer-readable medium of claim 15, wherein said predetermined indicator comprises an emergency flag that announces on said called party's communication device the existence of an emergency.

17. The computer-readable medium of claim 15, wherein said predetermined indicator comprises an urgent flag that announces on said called party's communication device the existence of an urgent matter requiring prompt attention.

18. The computer-readable medium of claim 15, wherein said non-interrupt setting comprises a call-diversion setting.

19. The computer-readable medium of claim 18, further comprising instructions that presents the called party with an option to receive said call despite the call-diversion setting on said called party's communication device, upon issuance of said alert.

20. The computer-readable medium of claim 15, wherein said non-interrupt setting comprises a call-blocking setting.

21. The computer-readable medium of claim 20, further comprising instructions that presents the called party with an option to receive said call despite the call-blocking setting on said called party's communication device, upon issuance of said alert.

22. A communication device configured to:
    participate in a call with a calling party's communication device,
    receive a predetermined indicator being transmitted from said calling party's communication device as part of said call between said calling party's communication device and said communication device, and
    override a non-interrupt setting on said communication device in response to receiving said predetermined indicator, wherein
    said predetermined indicator causes an alert to be issued on said communication device announcing the receipt of said predetermined indicator.

23. A communication device configured to:
    participate in a call with a called party's communication device, and
    send a predetermined indicator to said called party's communication device as part of a call between said communication device and said called party's communication device, wherein said predetermined indicator:
    overrides a non-interrupt setting on said called party's communication device, and
    causes an alert to be issued on said called party's communication device announcing the receipt of said predetermined indicator.

24. A method of communicating user related information between a calling wireless information device and a receiving wireless information device, said wireless information devices being adapted to establish a voice call therebetween, said receiving wireless information device having user related information and communicating said user related information to said calling wireless information device used by said caller, wherein
- said user related information is entered by said call recipient or is information of which said receiving device is aware;
- said user related information being indicative of the call recipient's availability, said information further being indicative of the call recipient's desire not to be disturbed, said method further comprising the step of:
- allowing said calling wireless information device to establish a call with said receiving wireless information device by overriding the user related information.

* * * * *